US008935002B2

(12) United States Patent
Ho

(10) Patent No.: US 8,935,002 B2
(45) Date of Patent: Jan. 13, 2015

(54) APPARATUS, SYSTEMS AND METHODS FOR PROVIDING PORTABLE STORAGE FOR MULTIPLE USERS

(76) Inventor: Johny Ho, Brooklyn, NY (US)

( * ) Notice: Subject to any disclaimer, the term of this patent is extended or adjusted under 35 U.S.C. 154(b) by 535 days.

(21) Appl. No.: 13/234,821

(22) Filed: Sep. 16, 2011

(65) Prior Publication Data
US 2013/0068638 A1    Mar. 21, 2013

(51) Int. Cl.
*G06F 7/00* (2006.01)
*B65G 1/00* (2006.01)
*B65G 1/02* (2006.01)

(52) U.S. Cl.
CPC ... *B65G 1/00* (2013.01); *B65G 1/02* (2013.01)
USPC .......................................... 700/215; 700/214

(58) Field of Classification Search
USPC ................................................ 700/215, 214
See application file for complete search history.

(56) References Cited

U.S. PATENT DOCUMENTS

| 3,860,130 | A | 1/1975 | Frangos |
| 6,842,665 | B2 | 1/2005 | Karlen |
| 6,923,612 | B2 | 8/2005 | Hansl |
| 7,689,480 | B2 * | 3/2010 | Solomon .......................... 705/28 |
| 2006/0220872 | A1 * | 10/2006 | Brown et al. ............... 340/572.7 |
| 2009/0149985 | A1 * | 6/2009 | Chirnomas ................... 700/215 |

FOREIGN PATENT DOCUMENTS

EP        1970327        9/2008

* cited by examiner

*Primary Examiner* — Ramya Burgess
(74) *Attorney, Agent, or Firm* — Robert W. Morris; Eckert Seamans Cherin & Mellott, LLC

(57) ABSTRACT

Apparatus, systems and methods for providing portable storage for multiple users are disclosed. The portable storage systems may be used to accommodate the storage needs of multiple users. The portable storage solutions provide the capability to individuals to store relatively small quantities of materials off-site for a fixed or an undetermined amount of time, and are designed such that, in most instances, the materials are returned to the user at the same or different location when they are desired. The portable storage apparatus, systems and methods are cost-effective and provide a consumer with more flexibility than standard storage options.

19 Claims, 9 Drawing Sheets

APPARATUS, SYSTEMS AND METHODS FOR PROVIDING PORTABLE STORAGE FOR MULTIPLE USERS

FIELD OF THE DISCLOSED SUBJECT MATTER

This is directed to apparatus, systems and methods for providing portable storage solutions for transient and multiple users.

BACKGROUND OF THE DISCLOSURE

For a variety of reasons, people often find that they just don't have enough room to keep everything they own in one place. Simple solutions, such as storing some of their goods at a friend's or relative's residence are often not the best solution. This has led to the widespread use of storage facilities often referred to as "self-storage," in which a user can rent out space on a regular basis (such as monthly or annually). In many of these instances, the user selects the amount of space he/she believes is necessary and then often only has limited access to the site to add or remove items (e.g., such facilities often have limited hours of operation and individuals are typically not provided with access unless the facility is open). In addition, the typical minimum size of such facilities often approaches 100 square feet.

In other instances, the need for storage is somewhat more temporary (e.g., versus a self-storage that is often kept for years). For example, in situations where a family is undergoing major renovations to their house (such that they move out temporarily), most of their belongings must be stored while they stay in temporary housing. One common solution to this circumstance to have what is essentially an enclosed "dumpster" delivered to the house so that the belongings can be put away (these "dumpsters" are sometimes referred to as "pods"). The "dumpster" can then sit in the driveway with all of the belongings while the renovations are accomplished, or it can be taken away and returned after the work has been completed. This type of solution, however, also has problems in that the dumpster is essentially a single use device for a single family; and that if it is taken away from the site, is basically inaccessible until it is returned. In addition, even if the dumpster stays on-site, the only way to retrieve items from the back of the dumpster is to essentially unpack it manually (and then repack it). Other potential problems with the dumpster approach include the issues involved if a family uses dumpsters during renovations, but lives in a multi-family dwelling, such as a duplex (or even the potential issues that could be raised by unhappy neighbors).

There appears to be, in fact, another situation for which neither of the above solutions are practicable. This situation relates to transients, such as college students, who spend a major portion of each of several years at a particular location, but must pack up and leave for another portion of each of those years. These individuals often could greatly benefit by avoiding the hassle and cost of moving their belongings home for the summer, only to have to move them back to campus again when school restarts in the following fall. If such a storage solution were provided, for example, the students could leave their schools belongings on-site and return home via a more convenient method than requiring someone to drive them home with their belongings. The dumpster approach, however, could result in the undesirable situation of dumpsters spending the summer strewn all over a college campus, as well as the fact that no single student would ever need that much storage.

The self-storage facilities and "dumpsters" are simply impractical, at least in part, because students typically do not have enough material to store to justify renting even the smallest enclosure in either instance. Moreover, students typically do not have easy and inexpensive access to a way to transport their goods to such a facility. Another alternative is to pack up the student's belongings and to ship them home. This option, however, is likely to be expensive, and still requires that the student get the packed belongings to the shipper (unless even more charges for pickup are incurred). Thus, transients, such as students, are often left with little choice but to drag their belongings back and forth as each cycle of residency changes.

SUMMARY OF THE DISCLOSURE

Apparatus, systems and methods are provided for providing portable storage solutions for transient and multiple users.

In one embodiment, a portable, self-contained, storage center is provided that can be transported to and from designated locations on specified dates or over a fixed range of dates (e.g., the units may be available at a college dorm from the day classes end until one week after final exams are over). The storage center can be configured for easy transport such that it can quickly and easily be moved between different locations while still being large enough to provide storage space for multiple users at a given location.

A portable storage center may store items from several different users all within the same housing. User items may be arranged within the center such that individual users picking up or dropping off items may have their items stored adjacent to each other within the same storage unit (or they may be stored in a haphazard manner within the center, provided that the location of each item is accounted for). The unit may include a user interface, an external portable housing, an internal framework, and an organization mechanism that may automatically organize users' items within the framework. The items may be stored in standardized bins, designed to fit within specific locations of the internal framework. In certain embodiments, the items may be stored in bins of various sizes, and the internal framework and organization mechanisms may be adjustable to accommodate the varying bins.

In certain embodiments, the user interface may be coupled to communications circuitry that may communicate with remote servers to modify user storage orders, to receive user payments, or to accommodate other user requests. The user interface may also be able to store user storage order data or payment data on local memory. Depending on drop off or pick up needs, multiple storage units may be sent to the same location for users to pick up or drop off their items. The external housing of a storage unit may be able to interconnect to the external housing of one or more other storage units.

The external housing may also be configured to be connected to a transportation device (e.g., truck, boat, car, airplane, etc.) for delivery to or from a pick up or drop off location (or, for example, the external housing may be configured to be part of the transportation device itself). The housing may use a variety of connection mechanisms (e.g., hooks, claps, wires, bolts, etc.) depending on the type of transportation device the housing will be connected to.

In certain embodiments, the external housing may, in fact be divided into multiple units. One unit, that may stay on location permanently or semi-permanently, may be the portion of the housing that contains the device that users may utilize to interact with the system, as well as the portion that accepts the storage units from the user and inputs them into the system (i.e., the input/output portion). The other portion of the housing (i.e., the storage portion) may be designed such that it temporarily mates with the input/out portion, and while mated accepts storage units for storage therein. The storage portion can include one or more mechanisms to move the input storage units to a particular internal location for storage (or transport a storage unit being retrieved to the input/output portion). The input/output unit may include temporary storage space that would enable storage operations to continue while the storage unit portion was being replaced (in which case, the temporarily stored items could be automatically moved to the storage unit as time permits).

In some embodiments, a user may walk up to the external housing to drop off or pick up stored items. The user may first approach the user interface, which can be a touch screen interface, a keyboard, a mouse, or any other combination typical for user interfaces. The user would then provide the proper identification in order to comply with security requirements. Once the user has been identified, the user may utilize the user interface to command the system as is appropriate. For example, if the user were dropping off items for storage, the user could place the items in a storage unit, and instruct the system that material needed to be stored. Another interface, such as a sliding panel, could then open to receive the storage unit. The user could wait while the storage unit is stored, and then the user could be provided with a confirmation receipt.

In one or more embodiments, a user may be able to designate another person to pick up or drop off his items for him. For security reasons, this may require a special user login when the designated person comes to drop off or pick up an item. The special login may allow the designee to pickup packages on behalf of the original user without allowing the designee access to the original user's account information or the ability to modify the original user's order.

Depending on storage availability and/or other factors, when the user goes to the storage center to pick up or drop off his belongings, he may be able to modify his original storage order from the storage provider. For example, the user may have the option of purchasing additional storage space if it is available, changing his pick up date, and/or changing his pick up location. The user may also have the option of paying for some or all of his storage costs while dropping off or picking up his items.

In various embodiments, the storage center can include network communications circuitry that can be configured to communicate with users and/or storage providers. For example, in certain embodiments, a user can specify his storage needs to a storage provider, and the storage provider can present the user with a list of available storage times and locations. For example, a user may specify that he needs to pick up or drop off a given number of items on a given date at or near a given location. If he is dropping items off, he may specify how long he plans on renting the storage space for and specify a desired pickup date. Based on the user's requirements, the storage provider may provide a list of available pick up or drop off dates and locations meeting the user's criteria. The user may also be provided with the opportunity to revise the desired pickup date remotely, without having to return to the location where the materials were dropped off.

If the available drop off and/or pick up locations or dates are inconvenient for a user, in certain embodiments, he may be able to contact a storage provider to schedule a personalized drop off or pick up date and/or location, depending on storage unit availability. In certain embodiments, the user may be charged additional fees for this convenience, and storage priority may be given to users who pick up or drop off their items at dates and locations specified by the storage provider.

In other embodiments, the network interface can also be utilized for increased efficiency. For example, the portable storage unit can provide real-time updates of stored materials to an upstream system. The upstream system can monitor each portable storage unit and may initiate a command for a replacement unit to be moved on-site if the amount of used storage units and/or used storage space exceeds a pre-determined threshold. That threshold may vary depending of the conditions, such as the rate at which storage units are being occupied. If the rate is slow, the system could wait until a larger percentage of units are utilized prior to initiating the replacement command. In either case, the system could send out a request for more storage space via the internet (through a Wi-Fi or cell connection), an SMS text message, an automated phone call, or other similar method.

BRIEF DESCRIPTION OF THE DRAWINGS

The above and other aspects and advantages of the disclosed subject matter will be apparent upon consideration of the following detailed description, taken in conjunction with accompanying drawings, in which like reference characters refer to like parts throughout, and in which.

DETAILED DESCRIPTION

Apparatuses and methods are disclosed for providing portable storage for multiple users.

Figure 1:
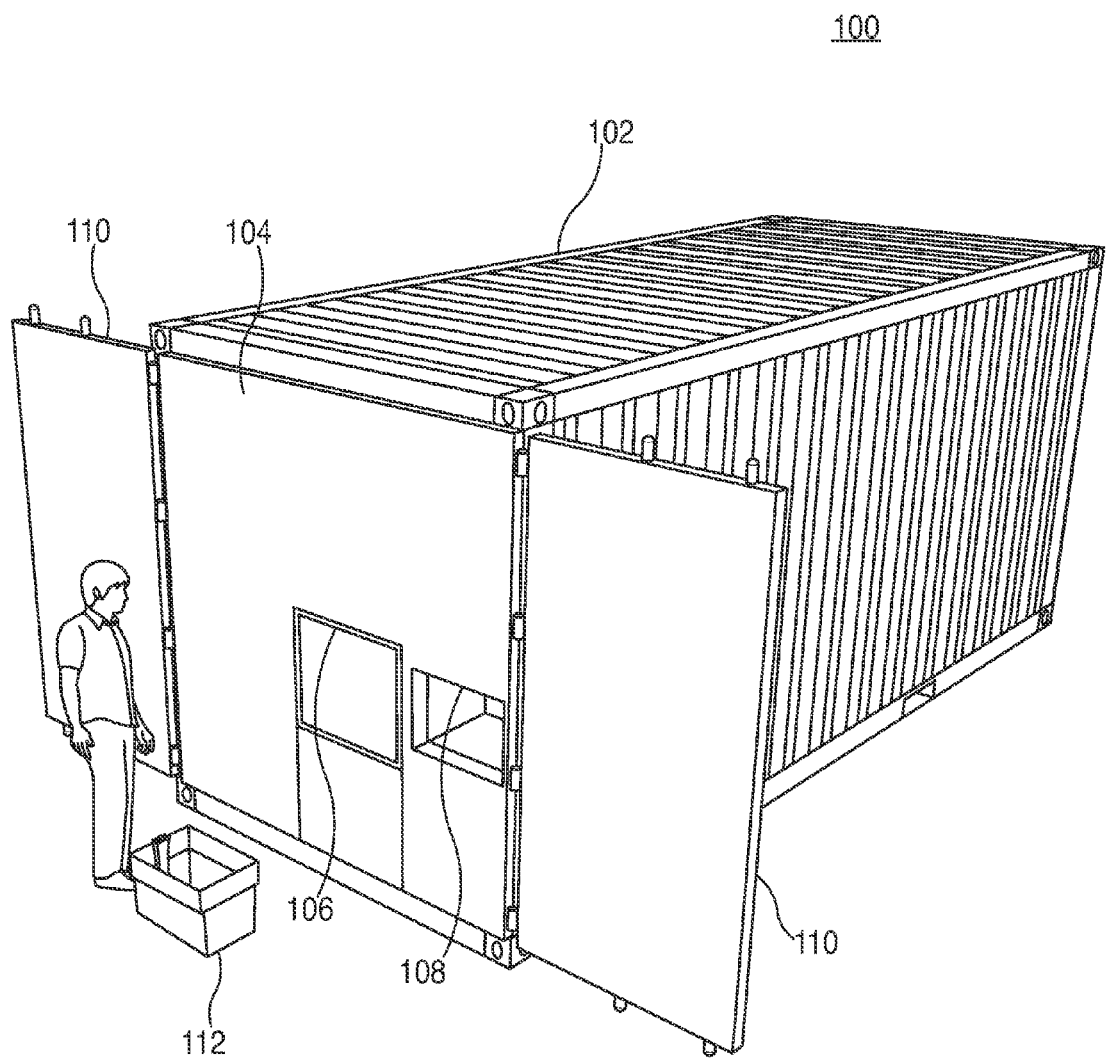
FIG. 1 is a schematic view of an illustrative portable storage center according to at least some embodiments of the invention.

FIG. 1 is a schematic view of an illustrative portable multiuser storage center 100, in accordance with at least some of the embodiments of the present invention.

Portable storage center 100 may include external housing 102, front screen 104, user interface device 106, input/output 108, security doors 110, and multiple storage bins 112. As is explained in more detail below, a user (shown for illustrative purposes in FIG. 1, but not referenced) can place one or more items in one of storage bins 112, utilize the user interface device to communicate with center 100, and place the selected storage bin 112 in input/output 108 such that the selected bin 112 is stored and categorized within center 100.

In some embodiments, one or more components of portable storage center 100 may be combined or omitted (e.g., security doors 110 may be omitted or they may be incorporated into front screen 104). In some embodiments, portable storage center 100 may include other components combined or included in those shown in FIG. 1 (e.g., a processor and memory associated with user interface device 106, an internal organization mechanism capable of arranging storage bins within the portable storage unit (such as that shown in some of the figures and described below), or a coupling device allowing portable storage unit to couple to a second portable storage unit or to a transportation system, which is also show in additional figures and described in more detail below).

Front screen 104 may be used to protect the internal framework, contents, and storage mechanisms of portable storage center 100. The design of front screen 104 can be modified depending on the size and use of portable storage center 100. For example, front screen 104 may have openings to accommodate user interface device 106 and/or input/output 108. Front screen 104 may also have ventilation gaps to help maintain proper atmospheric conditions within center 100. In some embodiments, front screen 104 may be removable, which may allow for easier storage and make cleaning and repairs easier. In other embodiments, front screen 104 may be fabricated from a material such as steel in order to protect the contents within center 100.

As is described in more detail below, user interface device 106 may be used by users of portable storage center 100, for example, to enter their account information, modify their orders, make payments, or to confirm previously made storage orders. User interface device 106 may include one or more data storage mediums (e.g., a hard-drive, solid state drive, flash memory, permanent memory (e.g., ROM), any other suitable type of storage component), a processor, network communications circuitry, and/or a user display screen. User interface device 106 may also include any suitable input interface, such as, for example, a button, a mouse, a keyboard, or a touch screen. If a network interface is provided, that interface may be wireless via a cellular network connection, a Wi-Fi connection or any other connection (or a combination of connections may be available). The network interface, if available, may be constantly active, such that every transaction is transmitted across the network, or it may be designed such that network interface transactions only occur periodically.

Figure 2:
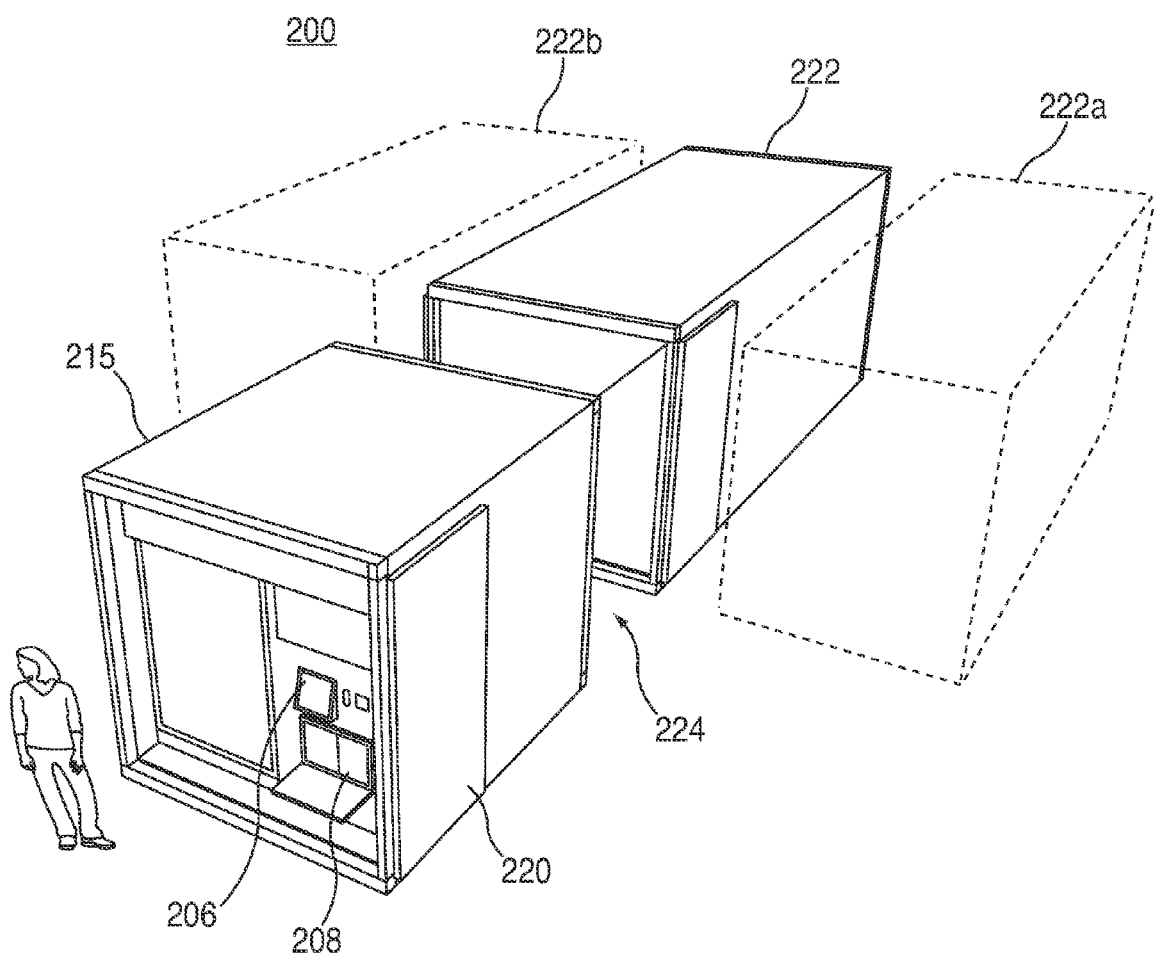
FIG. 2 is a schematic view of an illustrative portable storage center according to at least some embodiments of the invention.

The specific configuration of the portable storage center can vary in several ways. For example, FIG. 2 is a schematic view of at another embodiment of the present invention in portable storage center 200. Portable storage center 200 is similar to center 100 in many ways, however, the external housing has now been manufactured as two separate components, input/output housing 215 and storage housing 222. These two component pieces replace external housing 102 of FIG. 1. I/O housing 215 and storage housing 222 can be manufactured such that they can be mated together. If such a configuration were used, it would be advantageous to utilize multiple instances of storage housing 222.

I/O housing 215 may be configured such that it remains on-site during the entire period that loading occurs (or even longer if desired), while storage housing unit 222 may only remain on-site until it has reached a predetermined capacity. At that point in time, or at about that time, a replacement storage housing 222 may be brought to the site so that users will not incur a condition where there is not more room to store their materials. In unloading situations, it may be advantageous to utilize multiple instances of storage housing 222 (shown as dashed housings 222a and 222b), along with an interface unit (not shown in FIG. 2) that would be inserted roughly in the area noted by reference numeral 224. The interface unit (not shown) may enable all of storage housings 222, 222a and 222b to be operational simultaneously in order to dispense with stored materials in an efficient and timely manner (such as when students return to college to begin a new school year).

I/O housing 215 can contain some or all of the internal components of center 100. For example, I/O housing 215 can include an input interface device 206 that is substantially similar to device 106 described above. I/O housing 215 can also include input/output 208 (similar to input/output 108 of FIG. 1), and doors 220 can be similar to doors 110. In a manner similar to that described above, a user (shown without a reference numeral for illustration purposes only) can utilize one or more storage bins (such as bins 112 shown in FIG. 1) for storing materials within storage housing 222.

Figure 3:
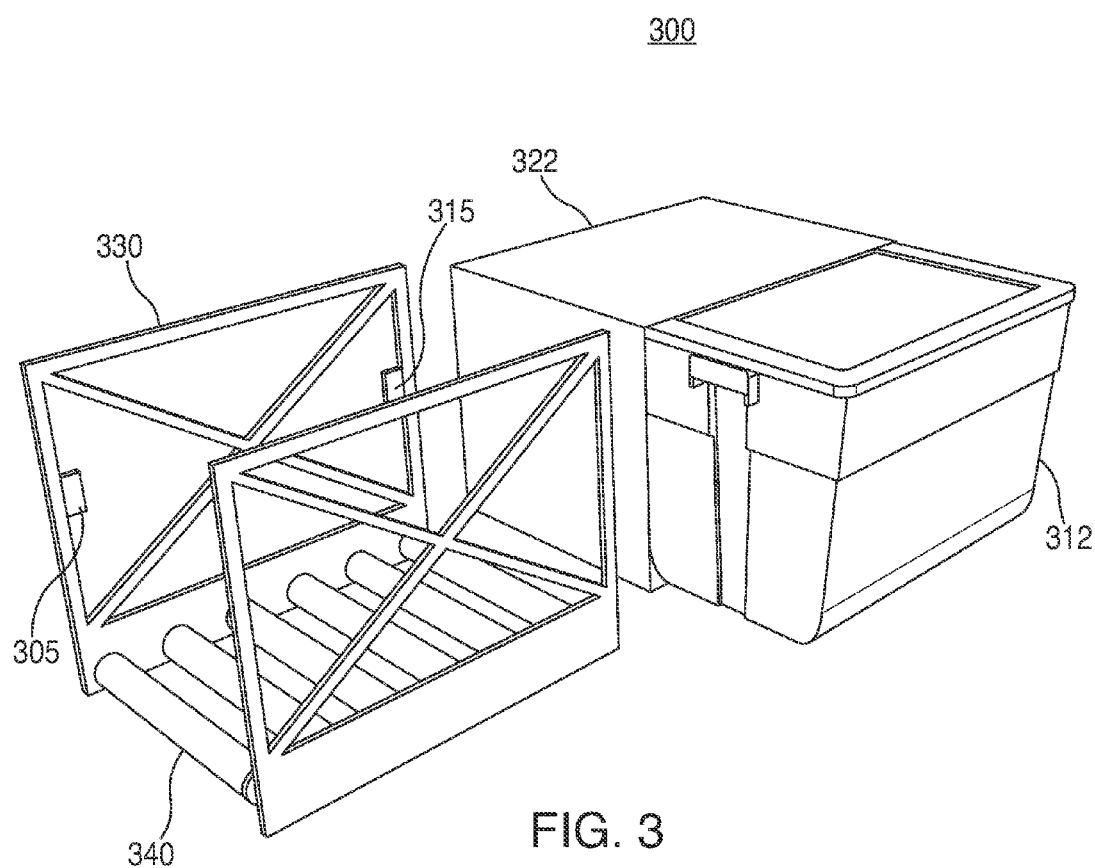
FIG. 3 is a schematic view of an illustrative storage bin and roller unit assembly for use in a portable storage center according to at least some embodiments of the invention.

FIG. 3 is a schematic view of an illustrative storage bin and roller unit assembly 300 for use in a portable multiuser storage system.

Assembly 300 may include sensors 305 and 315, storage bin 312, box 322 (box 322 is optional, as is described more fully below), framework 330, and rollers 340. Storage bin 312 may be similar to storage bin 112 shown in FIG. 1. In some embodiments, multiple instances of assembly 300 may be used as part of a portable storage system similar to portable storage center 100 of FIG. 1, or as part of portable storage center 200 of FIG. 2. Framework 330 and rollers 340 may utilized inside the storage center in close proximity to input/output 108 and/or 208, such that framework 330 and rollers 340 act to transport the storage bin from outside the center to the inventory control assembly that may be located within the storage housing portion of the center (regardless of whether that storage housing is simply the rear section such as in center 100, or a physically separate unit, as in storage housing 222).

In certain embodiments, it may be advantageous to have storage bin 312 stored inside storage box 322. For example, users may purchase or lease storage bins 312 and keep them at their residence when they are not being used to store materials in the storage center. As such, there may be markings, decorations, etc., that uniquely identify the storage bin as belonging to a specific user. In addition, the storage center may operate more efficiently through the use of bar codes, RFID tags/labels or the like that can be affixed to one of storage boxes 322 or storage bins 312, however, such identification may get damaged by the user if affixed to storage bins 312. The storage center can then read the code or label and use that information to identify the user, date stored, list of materials stored, location of storage within the storage housing, etc. In this manner, the bar codes or RFID tags/labels remain inside the storage center at all times.

As stated above, framework 330 and rollers 340 may be designed to allow storage bins 312 and/or storage boxes 322 to easily move from the user to the inside of the portable storage center. For example, once a user has placed a storage order using the user interface, such as the user interface described above, the storage center can retrieve an empty storage box 322 and send the empty box through framework 330 and across rollers 340 so that it appears at the input/output door. The user could then place the storage bin 312 inside the empty storage box 322 before putting box 322 back through the input/output door. Sensor 305 should detect that a storage bin or box has been inserted into center 300, while sensor 315 indicates that that the storage bin is moving from the input/output area into the storage area (additional sensors can be used to further refine the process).

Alternately, the storage center can be designed such that the user places storage bin 312 directly through the input/output door, where the center then places the bin inside of an empty storage box 322 (once again, so that the storage box remains internal to the storage center at all times). In addition, storage center 300 can be designed to utilize only storage bins 312, in order to simplify processing and handling. In this case, however, storage bins 312 would have to be designed to be sturdy, resilient and strong, as well as have protected identification symbols so that the bins do not get misplaced inside the storage center.

Figure 4:
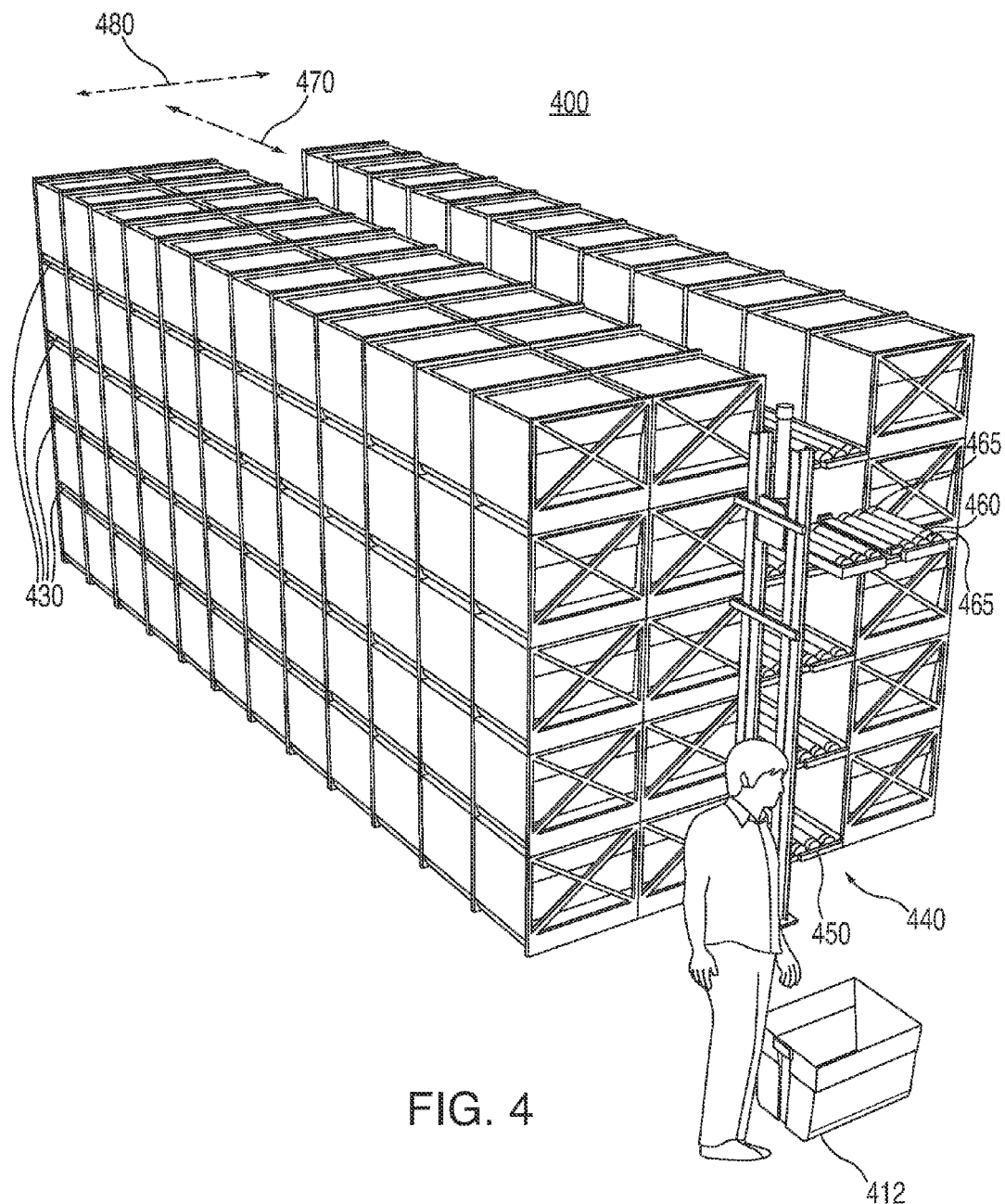
FIG. 4 is a schematic view of an illustrative internal inventory control assembly for use in a portable storage center according to at least some embodiments of the invention.

FIG. 4 is a schematic view of an illustrative internal inventory control assembly 400 for use in a portable multiuser storage center, such as centers 100 and/or 200 described above.

Assembly 400 may include a series of shelves 430 that can be adapted to store one or more storage bins 412 and/or storage boxes (similar to boxes 322 described above), a transport mechanism 450 and an elevator 460. Elevator 460 also includes sensors 465 that detect when a storage bin is placed on and taken off of elevator 460. Similar sensors, which are not shown for clarity, are placed throughout assembly 400 to track the status of the storage bin currently being manipulated in the assembly. Shelves 430 may be flat shelves or they may include one or more mechanisms that can be utilized to move storage bins 412 in to and out of place. For example, shelves 430 may be formed of rollers similar to rollers 340, in which case the rollers can be free moving, connected to controlled linkage such that they can change rolling direction on command, or a combination of both designs. Shelves 430 could also be formed from conveyor belt assemblies that can be controlled automatically based on commands from a command terminal (such as the processor coupled to the user interface described above). And shelves 430 can also be formed from a combination of those or other mechanisms that can assist in moving the storage bins throughout the storage center.

Shelves 430 may be organized in a series of rows and columns as shown in FIG. 4 to try and maximize storage capacity while maintaining the ability to automatically store and retrieve the stored bins (or boxes). In the illustration shown in FIG. 4, there are twelve columns and five rows, and one side can store two bins per shelf. Thus, the configuration shown could store up to 180 individual storage bins 412. Depending on the size of the storage bins 412 used, the shelves and spacing can be varied to accommodate more or fewer storage bins (e.g., bigger bins equate to less bins per storage housings).

In addition to shelves 430, assembly 400 can also include a transport mechanism 440 that can automatically communicate with assembly 300 (shown in FIG. 3), such that storage bins can be easily input by a user and stored, and then easily retrieved at a later time. Transport mechanism 440 can be formed integral with shelves 430, or it can be separately formed and assembled within the storage housing to cooperate with shelves 430. FIG. 4 shows transport 440 as a series of assemblies similar to rollers 340 of FIG. 3.

While the rollers are all shown in a single direction (side-to-side), assembly 440 can be constructed such that two sets of rollers that operate perpendicular to each other, or one set of rollers and one set of conveyors that operate perpendicular to each other. Such a configuration would enable transport 440 to move storage bins 412 up and down axis 470 until the storage bin was aligned with the appropriate column, and then to move the storage bin in a direction along axis 480 (essentially, perpendicular to the first axis of movement), such that the storage bin was placed into storage. In addition, elevator assembly 460 can be used to move storage bins to/from assembly 300 (of FIG. 3) from/to transport mechanism 450. It should also be noted that it would be advantageous for assembly 400 to be constructed in a somewhat modular manner, such that, for example, if two instances of assembly 400 were placed end-to-end, elevator 460 on one assembly could move storage bins 412 between the two assemblies (see FIG. 5 for more detail).

While operation of assembly 400 is described in more detail below, it should be noted briefly that an incoming storage bin 412 could be moved along assembly 300 to elevator 460. Elevator 460 could then capture the storage bin and raise or lower it to the appropriate floor for storage, before moving it to transport mechanism 450. Mechanism 450 could then move storage bin 412 along axis 470 to the proper column, and then along axis 480 into final position for storage.

Figure 5:
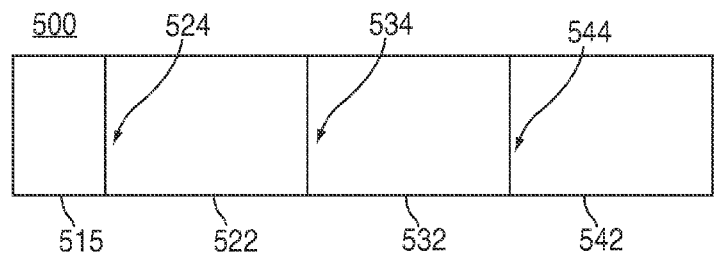
FIG. 5 is a schematic view of an illustrative portable storage center according to at least some embodiments of the invention.

FIG. 5 is a simplified schematic diagram of a portable storage center 500 constructed in accordance with at least one embodiment of the present invention. Center 500 can include I/O housing 515 (which is similar to I/O housing 215, and three instances of storage housing 222 which have been labeled 522, 532 and 542. Each of the instances of storage housing 222 can include an assembly 400 to manage the storage and transportation of storage bins 412 in and through the specific storage housing. Assemblies 400 are configured such that elevator 460 is located toward the front of each storage housing (e.g., the first elevator 460 would be located at position 524, the second at position 534 and the third at position 540). Center 500 can be utilized when space is available to increase the immediate capacity and flexibility of the storage center. For example, a single instance of assembly 400 as shown has the capacity to store 180 storage bins at one time, while three instances increases capacity to 540 storage bins. In addition, storage housings 532 and 542 could potentially be replaced, even while storage housing 522 was being populated with storage bins, so that users should never experience a 'Closed/Full' situation.

Figure 6A:
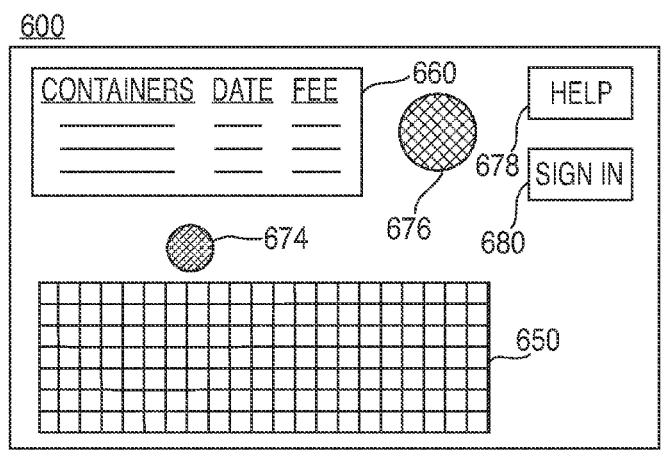
FIG. 6A is a schematic view of an illustrative user interface display for a portable storage center according to at least some embodiments of the invention.

FIG. 6A shows a sample illustration of a user interface that can be utilized with the portable storage centers described above in accordance with at least some embodiments of the invention. User interface 600 is one example of how user interfaces 106 and/or 206 could be implemented. User interface 600 includes a keyboard 650, a display region 660, a camera device 672, a microphone 674, a speaker 676, a 'HELP' button 678 and a 'SIGN IN' button 680. With the exception of the camera, microphone and speaker, all of the rest of the components of user interface 600 can be accomplished with discrete hardware or as part of a touch screen interface. If the entirety of user interface 600 were designed as a single touch screen display, camera 672, microphone 674 and speaker 676 could all be located slightly above the touch panel.

Camera 672, microphone 674 and speaker 676 can be user in combination with 'HELP' button 678 to provide the user with 'Live' assistance, if the user is experiencing problems. Such a configuration would require that the I/O housing portion contain some form of communication circuitry, such as a modem, cellular or Wi-Fi connection. The same hardware components can also be utilized for security purposes, both to monitor what happens to the user interface, as well as to provide a way to contact the authorities in the event that something undesired does occur.

User interface 600 can be utilized in many ways, some of which are described below in more detail. In addition, it may be advantageous for the user to utilize an internet-based account to manage the storage process. For example, a user could create an account on-line, including name and contact information, as well as a user ID and password. The user could then make a reservation on-line for storage space in the local portable storage center. When the user is ready to drop off the materials for storage, the user could then utilize user interface 600 by depressing 'Sign In' button 680 (either a physical button or a 'soft' touch screen button), which would activate a login page on display 660. Login could occur via keyboard 650 (which could be a physical keyboard or a touch screen keyboard). Then the user's reservation would appear for confirmation. Once confirmed, the storage center would take over and open the input/output door so that the user could start placing storage bins into the storage center.

Figure 6B:
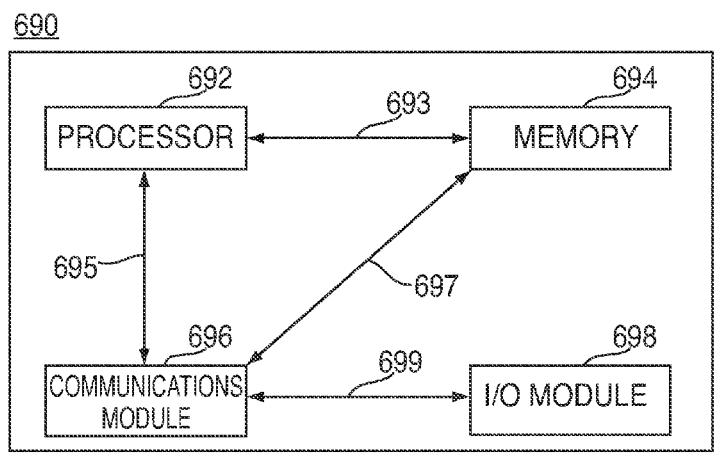
FIG. 6B is a schematic diagram of illustrative circuitry that can be used according to at least some embodiments of the invention.

FIG. 6B shows a schematic diagram of circuitry 690 that can operate according to at least some embodiments of the invention. Circuitry 690 can be utilized to provide some or all of the material displayed on user interface 600, control the input/output functions for camera 672, microphone 674 and speaker 676, as well as receive inputs from keyboard 650, display 660 (if it is a touch screen display) and buttons 678 and 680. Circuitry 690 can include processor 692, memory 694, communications module 696 and i/o module 698. Processor 692 can be coupled to the other components via connections 693 (to memory 694), 695 (to communications module 696) and 697 (to i/o module 698). In addition, communications module 696 and i/o module 698 can be coupled together via connection 699.

Circuitry 690 can operate to perform many of the functions described above, such as interfacing with the user, controlling some or all aspects of user interface 600, communicating with other systems within the corporate structure of the operator of the storage center so that any inputs made directly into the user interface are fed into the overall system management architecture, communicating with the authorities in the event that vandalism is attempted, etc. For example, when a user logs into the system on-site, processor 692 can verify the login information locally using data stored in memory 694, and then use communications module 696 to verify the reservation that the user is attempting to confirm, while communicating through i/o module 698.

Figure 7:
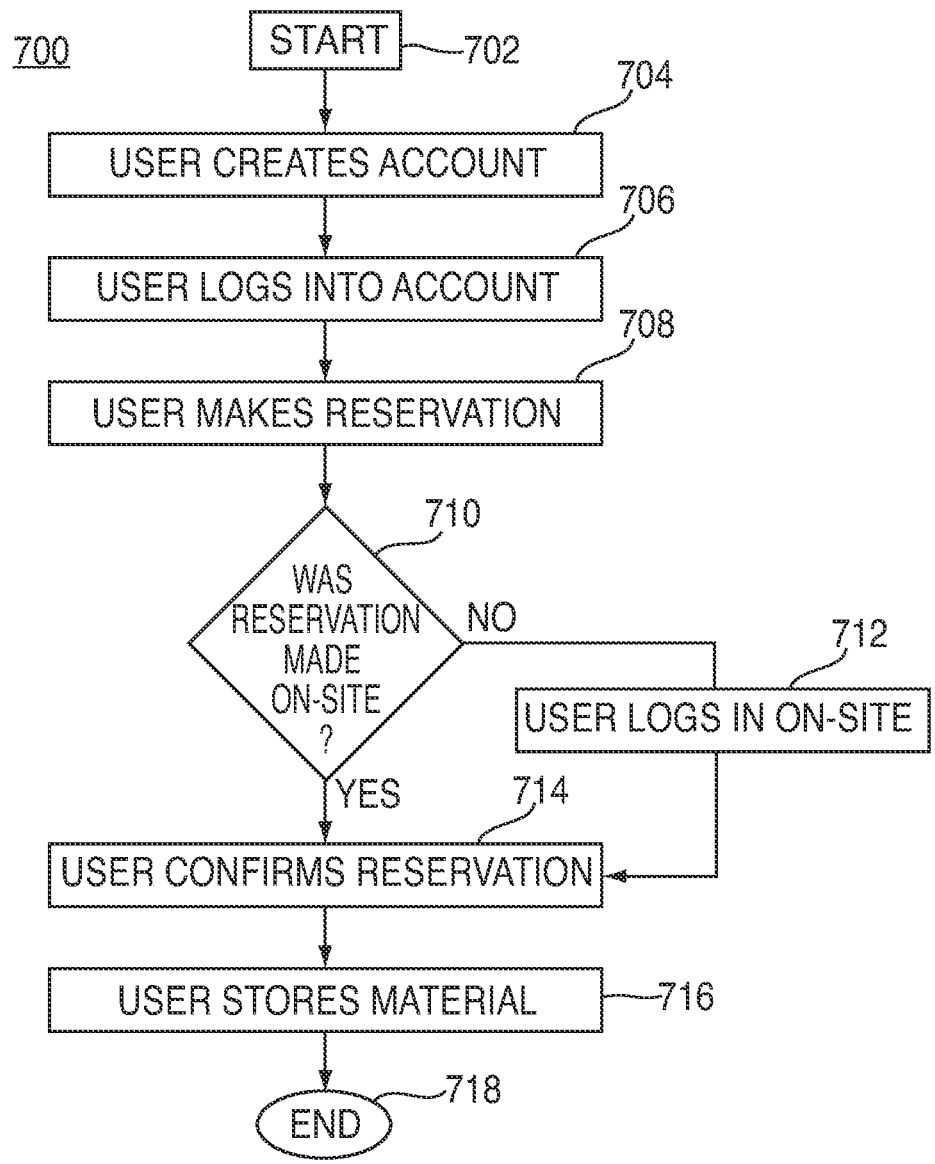
FIGS. 7-8 are flowcharts of a illustrative processes for storing items in a portable storage center according to some embodiments of the invention.

FIG. 7 shows a flow diagram that illustrates a process 700 in which a user can store materials in a portable storage center in accordance with at least some embodiments of the invention. Process 700 is the most basic process and it begins at step 702. The user creates an account at step 704, which should include a user ID and password, as well as contact information. Once the account has been created, the user logs into that account in step 706 (this step can be a separate and distinct step), or the system could automatically log the user in and move on to the reservation or home page of the system. Once the user is logged in, the user can then make a reservation in step 708.

A decision is made in step 710 whether the reservation was made on-site, in which case the process would proceed directly to step 714. Otherwise, the user must first log in to the account upon arrival at the portable storage center in step 712. The login process can occur using user interface 600, or a comparable interface. Once the user is logged in on-site, the user needs to confirm the reservation to start the storage process in step 714. Once the process has started, the door to the input/output device (such as device 108 or 208) opens and the user can begin placing storage bins into the portable storage center. Once the system determines that the number of storage bins in the reservation have been stored (or if the user elects to cancel any remaining storage bins), the process stops in step 718.

Figure 8:
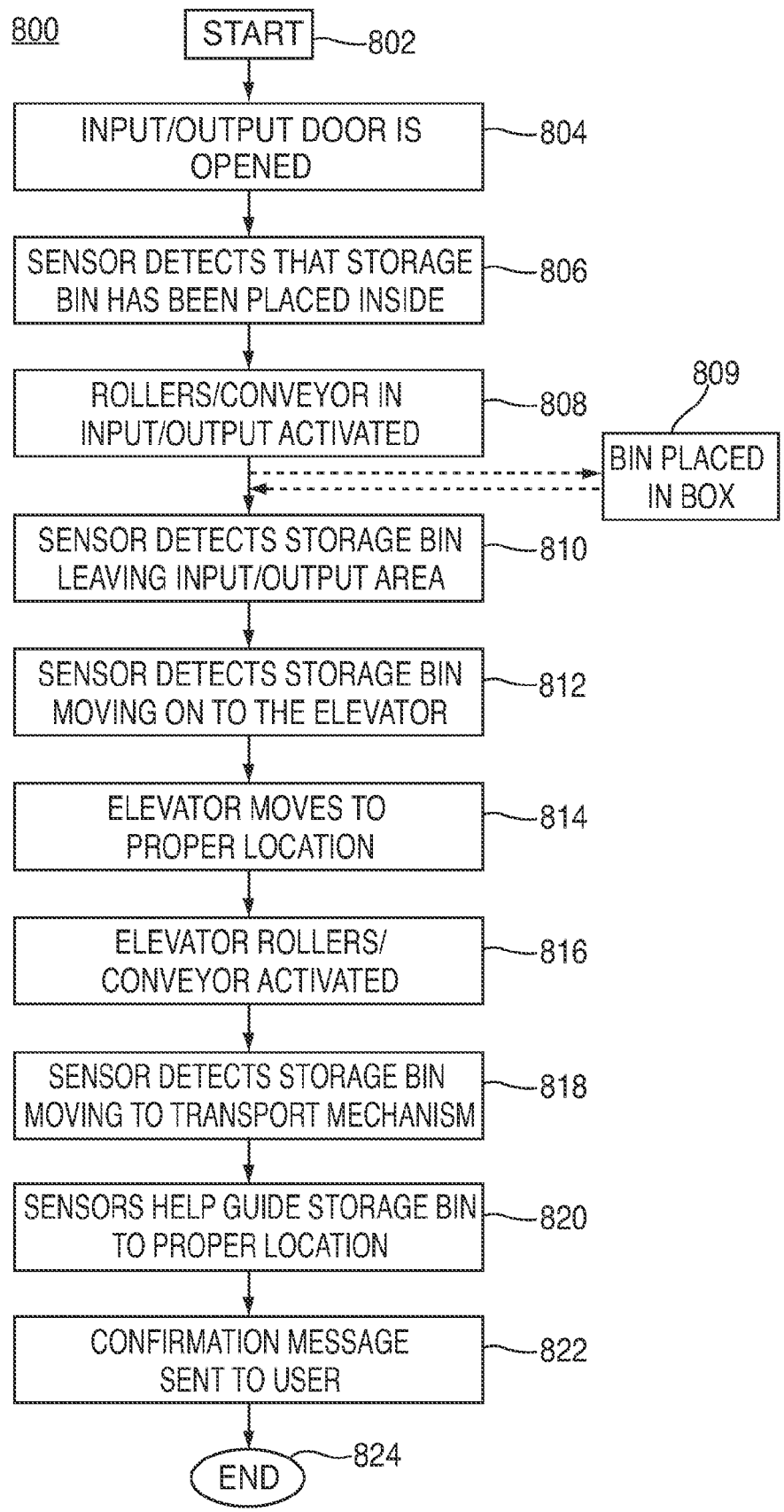

FIG. 8 shows a flow diagram that illustrates a process 800 that can occur once the user confirms the reservation in step 714 of process 700 (these steps can be the detailed steps that can occur in step 716 of process 700) in accordance with at least some embodiments of the invention. Process 800 begins at step 802. The input/output door is opened in step 804 and the user eventually places a storage bin inside the opening. A sensor, in step 806, detects that a storage bin is being inserted into the input/output section, then rollers or conveyors are activated in step 808 to pull the storage bin into the portable storage center. At this time, an optional step 809 may occur in which the storage bin is placed into a storage box that includes identification information, such as a bar code, RFID tag/label, etc. Such information may be included on the storage bin that the user manipulates, but that increases the likelihood that the identification may get damaged or dislodged and lost. However, it may be possible to embed an RFID tag with the storage bin itself, thereby significantly reducing the risk of damage to the identifier. In that case, it would be advantageous to omit step 809 and to utilize only the storage bins.

In either case, process 800 continues when a sensor, in step 810, detects that the storage bin is leaving the input/output area. Another sensor, in a step 812, detects that the storage bin is moving on to the elevator 460. The elevator moves to the proper level in step 814 (e.g., in the case of assembly 400, there are five different levels where the storage bin can be stored). Once the elevator has stabilized at the proper location, the rollers/conveyors are activated in step 816 to begin moving the storage bin to transport mechanism 450. A sensor detects that the storage bin is moving on to the transport mechanism in step 818. The transport mechanism, guided by inputs from sensors placed at various locations throughout the mechanism (such as at column), moves the storage bin to the proper location in step 820, and a confirmation message is sent to the user in step 822. The confirmation message can be sent to display 660, and/or directly to the user via the contact information associated with the user's account. Process 800 then stops at step 824 (or repeats itself for multiple storage bins).

Figure 9A:
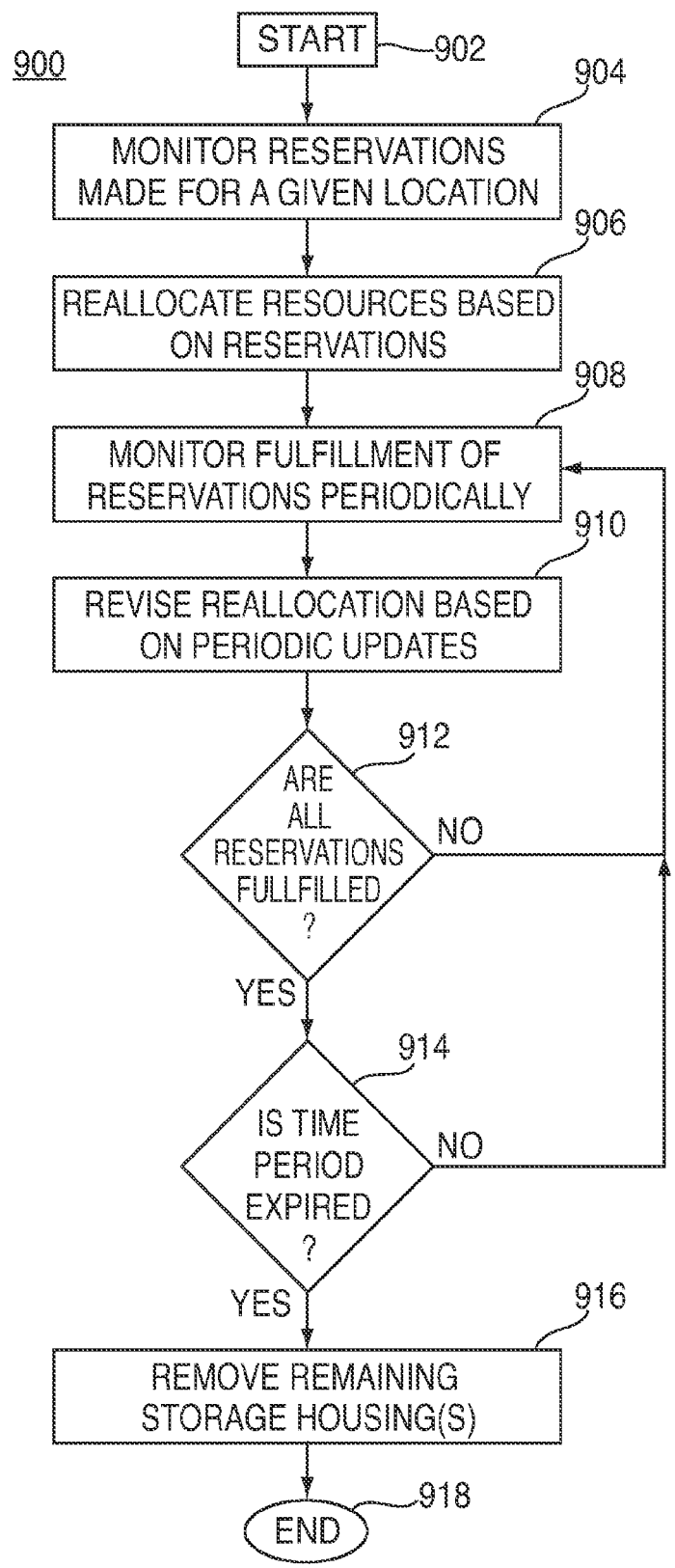
FIGS. 9A-9B are flowcharts of illustrative processes for managing a portable storage center according to at least some embodiments of the invention.

FIG. 9A is a flow chart of an illustrative process 900 for managing a portable storage center according to at least some embodiments of the invention. Process 900 begins in step 902. Reservations made for a given location are monitored in step 904. Resources are allocated for a given location based on the monitored reservations. This step may include, for example, directing users to another location (such as a different part of campus where there may be more room for more storage housings at the same time), increasing the frequency in which empty storage housing might be delivered to a given location to replace full housings, changing the size of the housings for a given location (i.e., making them smaller or larger as is appropriate). In addition, as described above, the system may constantly monitor capacity thresholds to automatically order additional storage housings. This may be particularly important if there is a large quantity of walk-up traffic, such as non-reserved storage requests and/or reserved storage requests that exceed the reserved quantity of storage space.

The system monitors the fulfillment of reservations on a regular basis in step 908. This can include direct real-time updates as each order is fulfilled via a network, Wi-Fi or cellular interface, or periodic updates in a similar manner, such as every hour, every six hours, etc. In step 910, resources can be additionally reallocated based on the periodic updates (for example, a user may have reservation for two storage units, but may update and fulfill the reservation for five storage units unexpectedly). Additionally, it may become apparent that a certain percentage of users are not fulfilling their reservations, which could lead to unnecessary excess capacity.

A periodic check is made in step 912 to see if all of the reservations have been fulfilled. If not, the process returns to step 908, but if they have been fulfilled, then a check is made as to whether the time on-site has expired. Once time has expired, regardless of whether all of the reservations have been fulfilled, the system may indicate that the remaining storage housing should be removed in step 916, and process 900 ends in step 918.

Figure 9B:
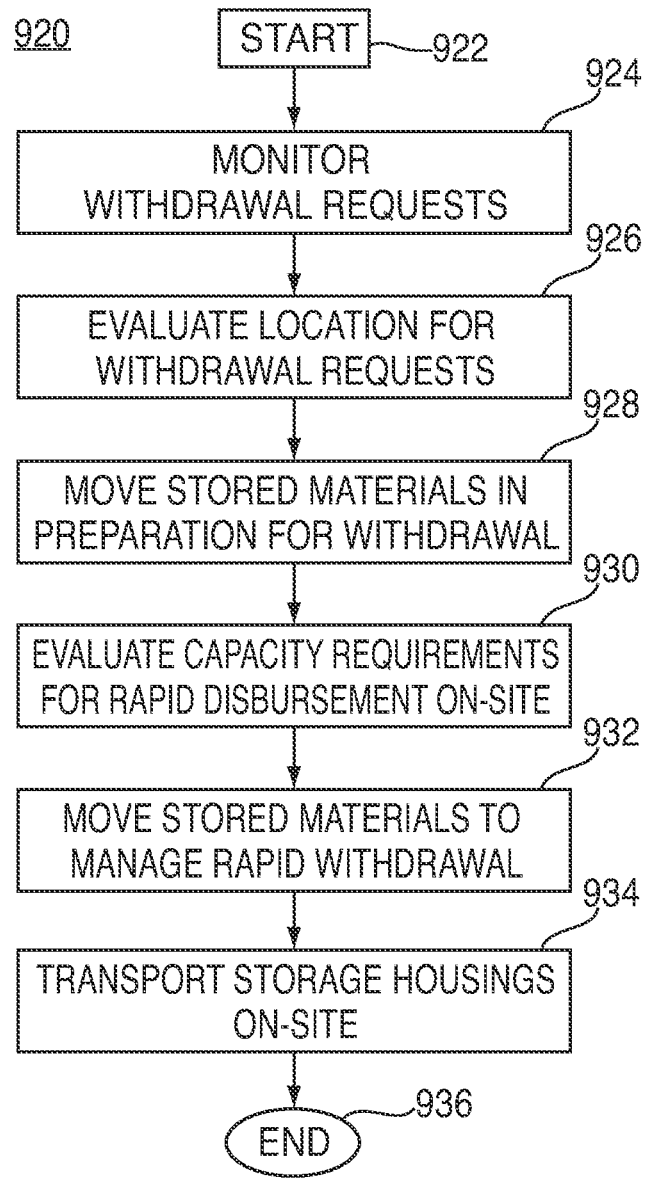

FIG. 9B is a flowchart of an illustrative process 920 according to at least some embodiments of the invention. Process 920 starts in step 922. In step 924, the system monitors withdrawal requests as they are processed for specific locations. Withdrawal requests, in general, may require a more compressed schedule in view of the fact that students typically are all required to be on location by a certain date versus the end of a semester when individuals typically leave a campus over a longer period of time as finals are completed. In addition, students may return to a campus at a different location than the location at which the materials were stored (e.g., such as a different dorm on the other side of campus).

As withdrawal requests come in, the system and management can begin to evaluate and plan for the return of stored materials, in step 926, based on the quantity, locations and proposed dates of withdrawal. Stored resources are then moved from one storage housing to another to attempt to manage and plan for changed locations in step 928. Additional evaluations can be made in step 930 to determine capacity requirements and on-site space requirements to meet the likely more rapid disbursement requests.

As planning determines that changes need to be made to meet with varying distribution requirements, materials are moved from one storage unit to another in step 932 to attempt to meet the rapid withdrawal requirements. Final planning occurs at the storage unit level and the storage units are transported on-site in accordance with a given plan at step 934, and process 920 ends at step 936.

In addition to picking up or dropping off belongings in a group setting (e.g., at a college at the end of the semester or school year), in certain embodiments, a user may pick up or drop off of his belongings on his "own" schedule, or a user may request that the stored items be retrieved and delivered. This beneficial feature, in accordance with at least some embodiments, is possible because the amount of material stored in each storage bin is relatively small, and because the location of each storage bin for every user is known. Thus, if an individual decided not to return to school after storing their materials on-site, the stored materials could easily be retrieved and shipped to the user.

The above described embodiments of the disclosed apparatus, systems and methods are presented for purposes of illustration and not of limitation. Further, it should be noted that the language used in the specification has been principally selected for readability and instructional purposes, and may not have been selected to delineate or circumscribe the disclosed subject matter. Accordingly, the disclosure of the presently disclosed subject matter is intended to be illustrative, but not limiting, of the scope of the claimed subject matter, which is set forth in the following claims.

What is claimed is:

1. A portable storage unit comprising:
an external portable housing, comprising:
an input/output housing; and
a storage housing detachably coupled to the input/output housing;
an assembly, located within the storage housing, operative to store a plurality of internal storage units;
a user input interface provided one of on and in the input/output housing operative to receive a plurality of user inputs, the plurality of user inputs including:
a first user input directing the portable storage unit to store a first selected internal storage unit; and
a second user input directing the portable storage unit to retrieve a second selected internal storage unit; and
a transport mechanism located within the storage portable housing and coupled to the assembly operative to manipulate a selected internal storage unit based on a received user input.

2. The portable storage unit of claim 1, wherein the storage housing is operative to be coupled to a second storage housing.

3. The portable storage unit of claim 1, wherein the user input interface is operative to communicate with a remote device.

4. The portable storage unit of claim 1, wherein the input/output housing comprises:
an input/output providing access to the plurality of internal storage units; and
a framework operative to transport internal storage units between the assembly and the input/output.

5. The portable storage unit of claim 1, wherein the user input interface is further operative to receive pickup location data.

6. The portable storage unit of claim 1, wherein the user input interface is further operative to receive payment data.

7. The portable storage unit of claim 1, wherein the external portable housing is operative to be coupled to a transportation device.

8. The storage unit of claim 7, wherein the transportation device is a truck.

9. A portable storage unit comprising:
an external portable housing;
an assembly, located within the external portable housing, operative to store a plurality of internal storage units, the assembly comprising:
a framework; and
a plurality of rollers rotatably coupled to the framework operative to transport an internal storage unit of the plurality of internal storage unit to a selected location within the assembly;
a user input interface operative to receive a plurality of user inputs for at least one of storing and retrieving a selected internal storage unit; and
a mechanism located within the external portable housing and coupled to the assembly which is operative to manipulate a selected internal storage unit based on a received user input.

10. The storage unit of claim 9, the assembly comprising:
a storage bin removably placed at least partially inside of the internal storage unit.

11. The storage unit of claim 10, further comprising:
at least one storage bin sensor that detects that the storage bin is placed at least partially inside the internal storage unit.

12. The storage unit of claim 9, further comprising:
at least one assembly sensor that detects that the internal storage unit is moving from an input/output area to a storage area within the housing.

13. The storage unit of claim 9, the mechanism comprising:
a plurality of shelves for storing the plurality of internal storage units, wherein the plurality of shelves comprise at least one level; and
a transport mechanism one of coupled to and integrally formed with the plurality of shelves, the transport mechanism configured to move the plurality of internal storage units among a level of the at least one level.

14. The storage unit of claim 13, the transport mechanism comprising at least one of:
a first set of rollers configured to move the plurality of internal storage units in a first direction;
a second set of rollers configured to move the plurality of internal storage units in a second direction, wherein the second direction is substantially perpendicular to the first direction; and
at least one conveyor belt configured to move the plurality of internal storage units in the second direction.

15. The storage unit of claim 13, further comprising:
an elevator one of coupled to and integrally formed with the plurality of shelves, the elevator configured to move at least one internal storage unit of the plurality of internal storage units between levels of the at least one level.

16. The storage unit of claim 15, further comprising:
at least one elevator sensor that detects that an internal storage unit of the plurality of internal storage units is moving from the elevator to the transport mechanism.

17. The storage unit of claim 13, further comprising:
a plurality of mechanism sensors that detect positions of the plurality of internal storage units within the external portable housing.

18. The storage unit of claim 2, wherein the mechanism is operative to move the plurality of internal storage units from the external portable housing to the second external portable housing.

19. The storage unit of claim 18, wherein:
the mechanism comprises a transport mechanism;
the second external portable housing comprises a second mechanism comprising (i) an elevator and (ii) a second transport mechanism coupled to the elevator, wherein the mechanism is operative to move the plurality of internal storage units from the external portable housing, and wherein the elevator is operative to move the plurality of internal storage units to the second transport mechanism.

* * * * *